(12) United States Patent
White et al.

(10) Patent No.: US 6,651,456 B1
(45) Date of Patent: Nov. 25, 2003

(54) SHELF SURROUNDING ICE CHEST WITH CART

(76) Inventors: Robert White, 846 No. Dixie Hwy., Lake Worth, FL (US) 33462; Richard White, 846 No. Dixie Hwy., Lake Worth, FL (US) 33462

( * ) Notice: Subject to any disclaimer, the term of this patent is extended or adjusted under 35 U.S.C. 154(b) by 0 days.

(21) Appl. No.: 10/425,126

(22) Filed: Apr. 28, 2003

(51) Int. Cl.[7] ................................................ F25D 3/08
(52) U.S. Cl. .................. 62/457.7; 211/189; 220/23.87; 280/79.3; 312/236
(58) Field of Search .......................... 62/457.1, 457.2, 62/457.7; 220/23.83, 23.86, 23.87, 915.2; 206/514; 211/189, 181; 280/79.3; 248/129; 312/236

(56) References Cited

U.S. PATENT DOCUMENTS

| | | | |
|---|---|---|---|
| 4,098,486 A | | 7/1978 | Hornsby |
| 4,592,482 A | * | 6/1986 | Seager ....................... 220/318 |
| 4,667,484 A | * | 5/1987 | Tarozzi et al. ................ 62/371 |
| 5,437,165 A | | 8/1995 | White |
| 5,605,056 A | * | 2/1997 | Brown et al. ............... 62/457.4 |
| 6,076,298 A | * | 6/2000 | Teel ............................ 43/54.1 |
| 6,237,765 B1 | * | 5/2001 | Hagen et al. .......... 206/315.11 |
| 6,269,965 B1 | | 8/2001 | White |
| 6,276,164 B1 | * | 8/2001 | Santa Cruz et al. ........ 62/457.7 |
| 6,357,252 B1 | * | 3/2002 | Rand .......................... 62/457.7 |
| 6,446,988 B1 | * | 9/2002 | Kho .......................... 280/47.26 |
| 6,463,756 B1 | * | 10/2002 | Lewis ........................ 62/457.7 |
| 6,467,779 B1 | * | 10/2002 | Mills ........................ 280/47.26 |
| 6,474,097 B2 | * | 11/2002 | Treppedi et al. ........... 62/457.7 |
| 6,497,424 B2 | * | 12/2002 | Gartner et al. ............. 280/47.4 |
| 6,574,983 B2 | * | 6/2003 | Smith et al. .................. 62/372 |

FOREIGN PATENT DOCUMENTS

| | | | |
|---|---|---|---|
| JP | 10134899 A | * | 5/1998 |
| JP | 10250778 A | * | 9/1998 |

* cited by examiner

*Primary Examiner*—William E. Tapolcal
*Assistant Examiner*—Mohammad M. Ali
(74) *Attorney, Agent, or Firm*—Alvin S. Blum

(57) ABSTRACT

An insulated cooler having a narrower upper portion and a wider lower portion with a ledge therebetween is transformed into an elegant food dispensing station. A shelf that surrounds the cooler at its upper portion is formed from a horizontal panel with an aperture great enough to pass the upper portion of the cooler and rest on the ledge. The shelf may be provided with features for holding items on its surface such as glasses. It may have features for mounting a skirt that conceals the lower portion of the cooler. The assembly may include a rolling cart that is also concealed by the skirt to provide a complete self-contained dispensing station for parties.

12 Claims, 4 Drawing Sheets

1

SHELF SURROUNDING ICE CHEST WITH CART

This invention relates to apparatus used in conjunction with ice chests or coolers, and more particularly to a shelf surrounding, and supported by, an ice chest or cooler that may be on a rolling cart.

BACKGROUND OF THE INVENTION

Insulated coolers are well known. They are often used at events where the food contents of the cooler are dispensed. It is convenient to have a horizontal surface nearby on which to support various items used in the dispensing such as cups, plates, utensils, and the like. Although coolers are convenient for party use, they are not attractive additions to party decor.

SUMMARY OF THE INVENTION

It is accordingly an object of the invention to provide a horizontal support surface in a form most convenient for use in conjunction with the cooler. Many coolers in use today have an exterior surface shape with vertical side walls that include a wider lower portion that terminates in a narrower upper portion, with a ledge between the upper and lower portions. The shelf or support surface of the instant invention comprises a large planar panel with a large central aperture dimensioned to permit passage of the upper sides, but small enough to prevent passage of the lower sides, thereby resting on the ledge. The resulting shelf is thus securely supported on the chest at a convenient level with a surface that surrounds the chest. The shelf may be variously equipped to further enhance its utility, such as by provision of cup holders, a raised edge, and the like. It may be provided with means to surround and obscure the major portion of the cooler with an attractive skirt.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 2:
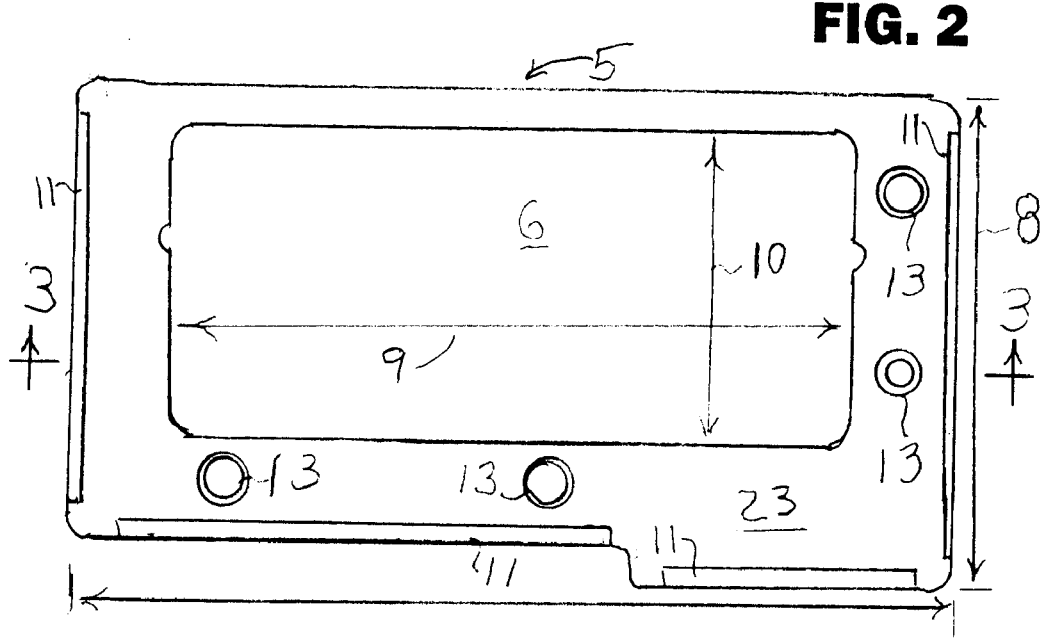
FIG. 2 is a top view of a shelf of the invention.
Figure 1:
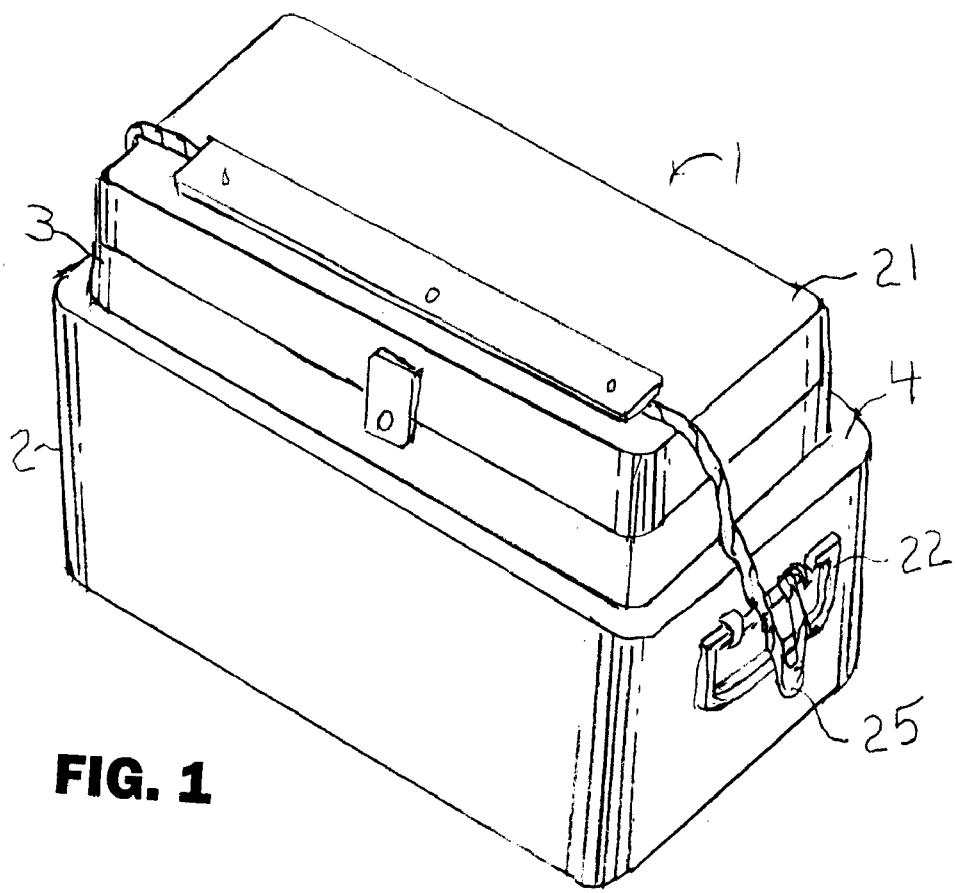
FIG. 1 is a perspective view of a cooler of the invention.
Figure 4:
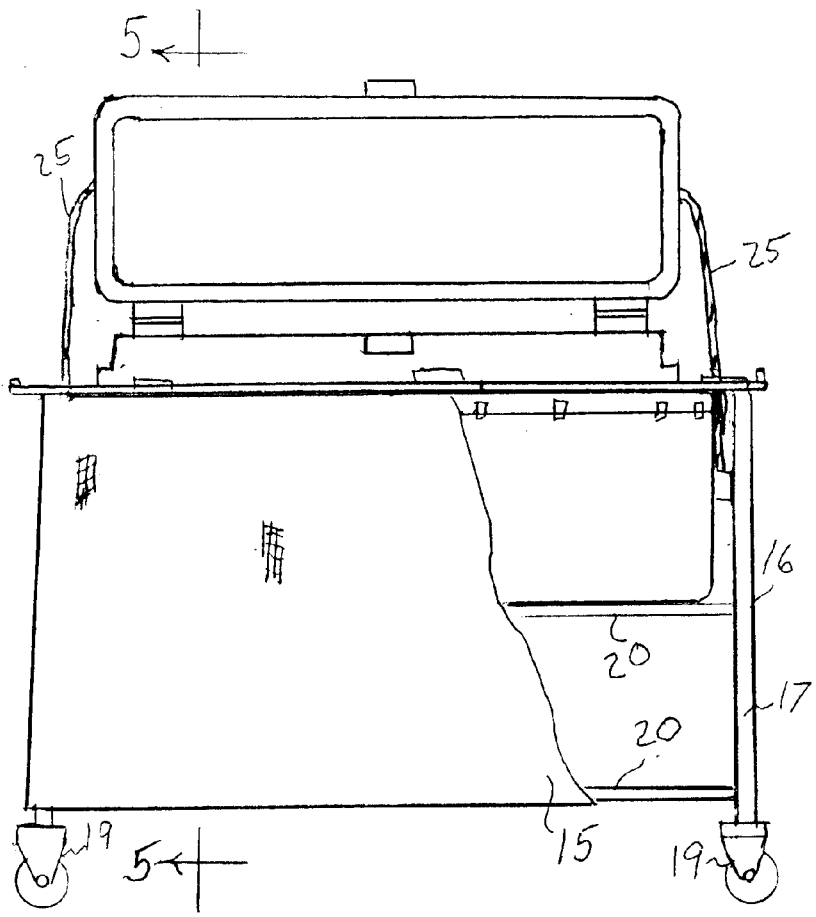
FIG. 4 is a front elevation view of a serving cart assembly of the invention with a portion of the skirt broken away.
Figure 3:
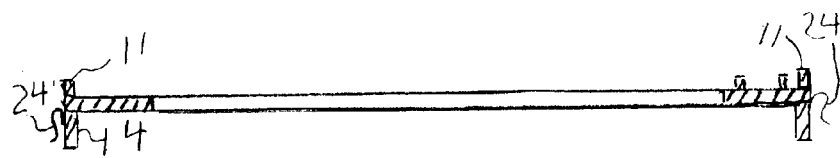
FIG. 3 is a sectional view taken through line 3—3 of FIG. 2.

Referring now first to the drawing FIGS. 1–5, a conventional insulated ice chest or cooler 1 is shown with a hinged top cover 21 and handles 22. The cooler has a narrow upper portion 3, a wider, taller lower portion 2, and a ledge 4 therebetween. The cooler has been modified by a hold-open cord 25 secured to the handles 22 and the cover 21. A shelf 5, in the form of a substantially rectangular panel, has a width 7 and a depth 8 that are greater that those overall dimensions of the cooler. An aperture 6 in the shelf 5 has a width 9 and a depth 10 that are greater than those of the upper portion 3, and less than those of the lower portion 2. Consequently, when the shelf is placed over the cooler, the narrower portion 3 passes through the aperture, and the shelf comes to rest securely on the ledge 4, since it cannot pass over the larger portion 2. The shelf thereby provides a support surface 23 that surrounds the cooler at a convenient height, and also conveniently close to the cooler for holding items related to dispensing the cooled contents of the cooler. The surface 23 may be provided with indentations 13 for holding various items such as glasses. These may be formed by elevations on the surface. An elevated lip 11 may be provided at the outer edge of the shelf to help retain items. A lip 14 dependant from the shelf may be provided for attachment of a skirt 15 to conceal a major portion of the cooler with skirt attachment means such as spring clips 24. Cords 25 attached to handles 22 may hold the cover open.

A rolling cart or leg assembly 16 has vertical corner posts 17 with casters 19, horizontal members 18, and transverse partitions 20 to support the cooler atop when in use, and below when not in use. The lower partition may be used to store items such as cups, plates, and the like. The assembly provides a self-contained rolling dispensing station with its own cold storage in an attractive package that is suitable for formal gatherings.

Figure 6:
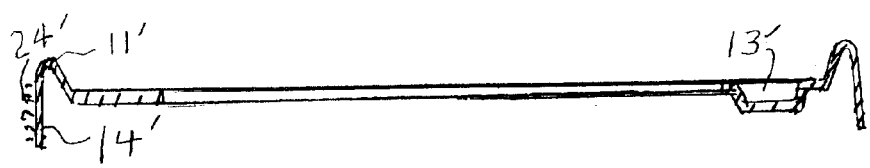
FIG. 6 is a sectional detail of another embodiment of the shelf.

Referring now to the drawing Fig.6 another configuration of the shelf cross section is shown with the elevated lip 11' and dependant lip 14' having hook portion of a hook and loop attachment 24' for a skirt. Indentations 13' are formed for holding items on the surface. The shelf of this embodiment may be made by vacuum forming.

Figure 5:
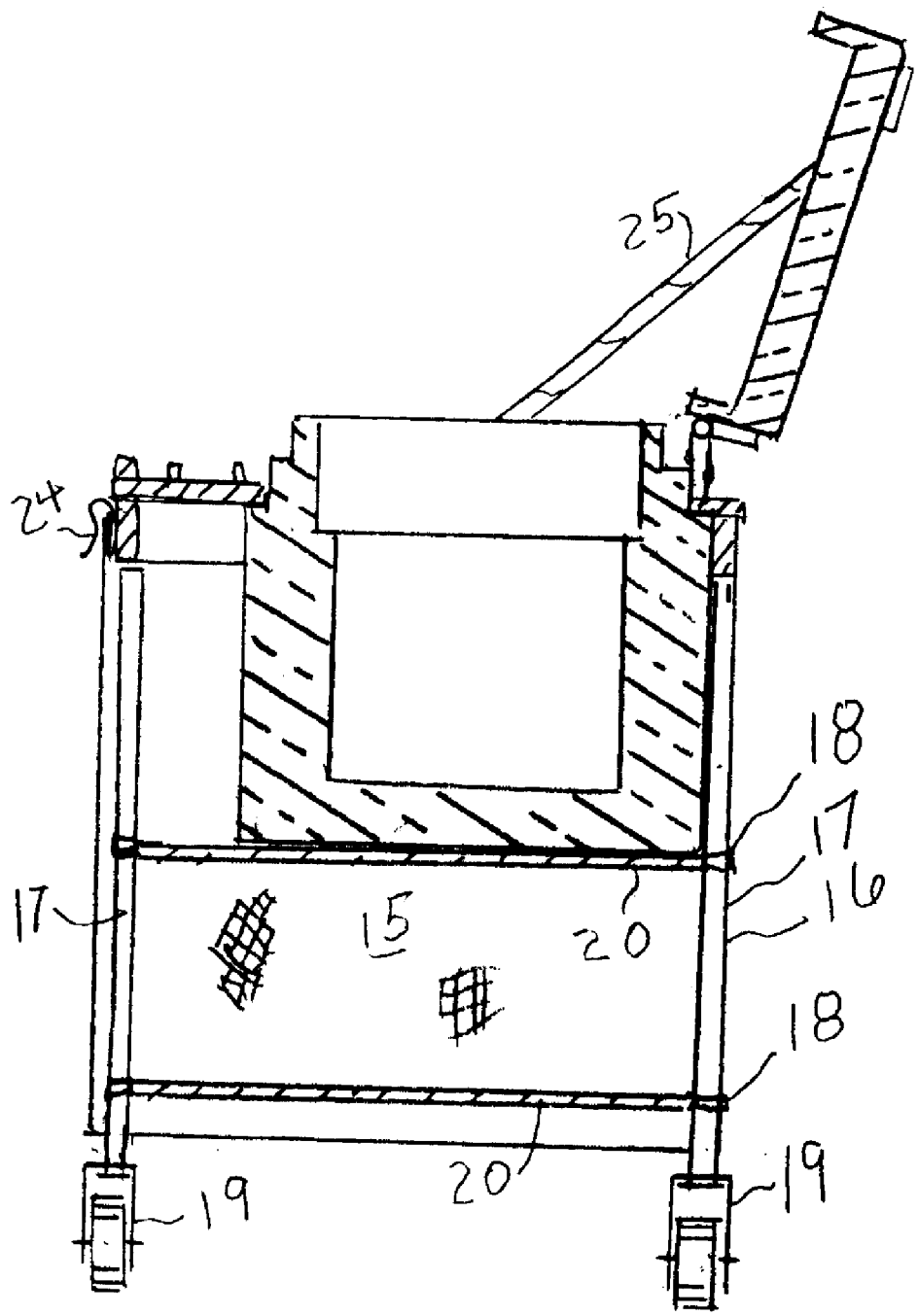
FIG. 5 is a sectional view taken through line 5—5 of FIG. 4.
Figure 7:
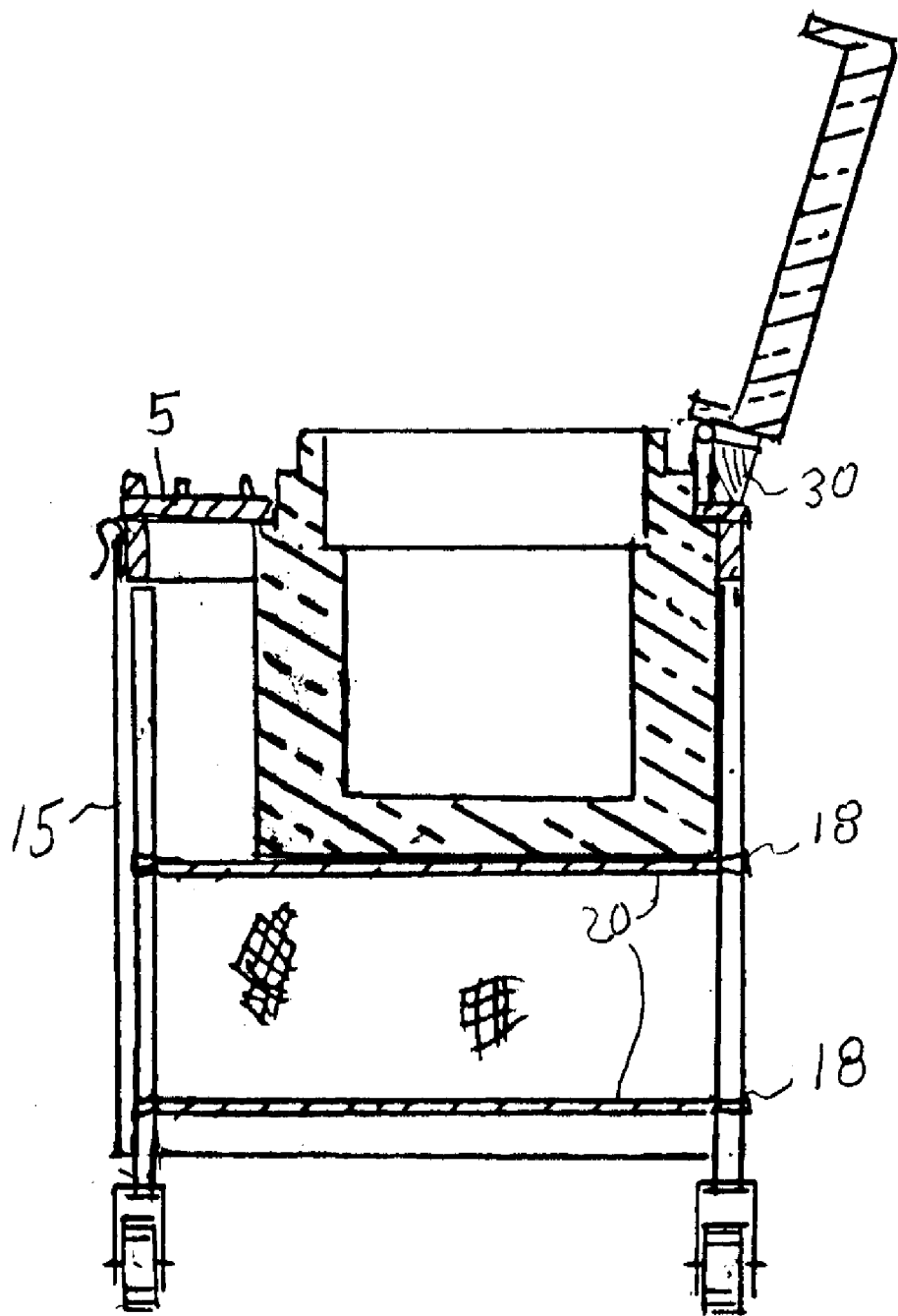
FIG. 7 is a sectional detail of another embodiment of the shelf.

Referring now to the drawing Fig.7, another configuration of the shelf is shown in a cross section as in FIG. 5. At least one projection 30 is upstanding from the shelf 5 to engage the cover and hold it in open position in place of the cords 25 of the FIG. 5 embodiment.

While we have shown and described the preferred embodiments of our invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A horizontal shelf for use in conjunction with an ice chest or cooler, when the cooler has outer side walls with a wider lower portion and an narrower upper portion with a ridge therebetween, the shelf comprising:

a) a substantially rectangular horizontal panel having width and depth dimensions greater than those of the cooler;

b) an aperture in the panel dimensioned to pass the upper portion of the side walls, but not the lower portion of the side walls, for thereby supporting the shelf securely on the ridge with support surfaces surrounding the cooler; and c) an elevated lip attached to the shelf outer edge.

2. The shelf according to claim 1 further comprising indentations on the shelf surface for holding various items.

3. The shelf according to claim 2 further comprising a lip attached to the shelf that extends below the panel.

4. A horizontal shelf for use in conjunction with an ice chest or cooler, when the cooler has outer side walls with a wider lower portion and an narrower upper portion with a ledge therebetween, the shelf comprising:

a) a substantially rectangular horizontal panel having width and depth dimensions greater than those of the cooler; and b) an aperture in the panel dimensioned to pass the upper portion of the side walls, but not the lower portion of the side walls, for thereby supporting the shelf securely on the ledge with a support surface surrounding the cooler.

5. The shelf according to claim 4 further comprising indentations on the support surface for holding various items.

6. The shelf according to claim 5 further comprising a lip attached to the shelf that extends below the panel for attachment of a concealing skirt thereto.

7. A serving cart assembly comprising:

a) an insulated ice chest or cooler, the cooler having outer side walls with a wider lower portion and a narrower upper portion with a ledge therebetween;

b) a shelf in the form of a substantially rectangular horizontal panel having width and depth dimensions greater than those of the cooler;

c) an aperture in the panel dimensioned to pass the upper portion of the side walls, but not the lower portion of the side walls, the shelf supported securely on the ledge with support surface on the shelf surrounding the cooler; and d) a rolling leg assembly removably connected to the cooler for elevating the cooler above a support, the leg assembly having wheels for rolling on the support.

8. The serving cart assembly according to claim 7 further comprising an elevated lip attached to the shelf outer edge.

9. The serving cart assembly according to claim 8 further comprising indentations on the support surface for holding various items.

10. The serving cart assembly according to claim 7 further comprising indentations on the support surface for holding various items.

11. The serving cart assembly according to claim 10 further comprising a lip attached to the shelf that extends below the panel provided with means for attachment of a concealing skirt thereto.

12. The serving cart assembly according to claim 10 further comprising a skirt attached to the means for attachment.

\* \* \* \* \*